(12) United States Patent
Jang

(10) Patent No.: US 6,424,788 B1
(45) Date of Patent: Jul. 23, 2002

(54) METHOD AND APPARATUS FOR CONTROLLING INTERMITTENT RECORDING SITE

(75) Inventor: Soo Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/081,771

(22) Filed: May 21, 1998

(30) Foreign Application Priority Data

May 21, 1997 (KP) ............................................. 97-20672
Apr. 14, 1998 (KR) ............................................. 98-13967

(51) Int. Cl.[7] ................................................. H04N 5/76
(52) U.S. Cl. ............................. 386/46; 360/5; 348/143
(58) Field of Search ................................. 386/1, 45, 46, 386/125, 126, 117; 358/906, 909.1; 348/143; 360/5, 99.02, 99.06, 90; H04N 5/76, 9/79, 5/92

(56) References Cited

U.S. PATENT DOCUMENTS 5,193,033 A * 3/1993 Shimoi et al. ................. 360/31
5,313,344 A * 5/1994 Sakaguchi et al. ............. 360/71
5,539,528 A * 7/1996 Tawa ........................... 386/110

FOREIGN PATENT DOCUMENTS

JP 6-261284 9/1994

* cited by examiner

Primary Examiner—Thai Tran
(74) Attorney, Agent, or Firm—Birch, Stewart, Kolasch & Birch, LLP

(57) ABSTRACT

In the method and apparatus for controlling an intermittent recording state, an operating mode is received from a user. The operating mode indicates an operation period and a pause period, wherein operations are performed on a tape medium during the operation period and no operation is performed on the tape medium during the pause period. The pause period is compared with a predetermined period of time, and if the pause period exceeds the predetermined period of time, the tape medium is disengaged from the recording/reproducing head of the recording/reproducing apparatus during the pause period and/or the rotation of the recording/reproducing head is stopped during the pause period.

16 Claims, 5 Drawing Sheets

| the set time in time-lapse mode | the recording pause period in seconds | recording state |
|---|---|---|
| 2 H | - | tape loading or rotation of head drum during no record |
| 6 H | 10 | |
| 12 H | 25 | |
| 24 H | 55 | |
| 48 H | 115 | |
| 72 H | 175 | tape unloading or stop of head drum during no record |
| 120 H | 295 | |
| 240 H | 595 | |
| 480 H | 1195 | |

METHOD AND APPARATUS FOR CONTROLLING INTERMITTENT RECORDING SITE

BACKGROUND OF THE INVENTION

1. Field of the Invention

The present invention relates generally to a method and apparatus for intermittent recording in a time-lapse video tape recorder, and in particular, to a control method for intermittent recording in a time-lapse video tape recorder that is capable of calculating a recording pause period based on a time-lapse recording mode, and capable of (1) stopping the rotation of the head drum temporarily and/or (2) unloading the magnetic tape that has been loaded for recording when the calculated recording pause period is longer than a predetermined period of time.

2. Brief Description of the Prior Art

Unlike ordinary continuous video tape recorders, which record every frame of video signals, the time-lapse video tape recorder intermittently records video signals from several video cameras or the like on a magnetic tape at a pre-selected regular interval while the recorder repeatedly runs and stops. Time-lapse video tape recorders have been used in various areas requiring long-time recording, such as security monitoring systems in banks and museums. As shown in FIG. 8, a time-lapse video tape recorder comprises switching unit 10, which selects a signal among video signals received from several video cameras; control unit 20, which extracts one frame intermittently from the continuous video signal received from the switching unit 10; and recording unit 30 which records the video signal as a frame is received from the control unit 20 on a frame basis in each video track of a magnetic tape.

The recording unit 30 comprises a signal processing unit, which processes the video signal for recording, and mechanical elements. The mechanical elements include a loading motor which moves a loading post into a loading/unloading state of the magnetic tape; a drum motor which rotates a head drum on which video heads are mounted to record/reproduce the video signal on/from the magnetic tape; and a capstan motor which rotates a capstan shaft to drive the magnetic tape at a predetermined tape running speed.

For example, in a conventional time-lapse video tape recorder configured as above, if a magnetic tape of 2 hours running time is used for recording during 48 hours, then the switching unit 10 switches to the next video camera at intervals of time corresponding to 24 video frames (48 hours/2 hours=24). The switching unit 10 receives a video signal from the video camera selected, and sends the received video signal to the control unit 20. Then, the control unit 20 extracts one frame out of the video signal received from the switching unit 10 and records the extracted frame on the magnetic tape while moving a single video track of the magnetic tape by driving the capstan motor in the recording unit 30.

In case of the prior art above, while the video signal is recorded on the magnetic tape intermittently, the magnetic tape is loaded in the recording unit 30 even when no video signal is recorded. The rotation of the capstan motor is stopped temporarily when recording is paused, but the head drum always rotates. Therefore, high-precision control of the capstan motor is required to perform repeated run-and-stop of the magnetic tape by one video track. In addition, because the magnetic tape is always in contact with the head drum, even when no video signal is recorded on the magnetic tape, friction between the magnetic tape and the head drum lowers the quality of the video signal recorded on the magnetic tape and shortens the life of the magnetic tape and head drum.

SUMMARY OF THE INVENTION

One objective of the present invention is to solve the above mentioned problems in the conventional method, and a further objective is to provide a control method and apparatus for intermittent recording in time-lapse video tape recorder that is capable of unloading the magnetic tape or temporarily stopping the rotation of the head drum when recording is stopped.

Another objective of this invention is to provide a control method and apparatus for intermittent recording in a time-lapse video tape recorder that selectively performs unloading of the magnetic tape or temporary stopping of the rotation of the head drum depending on whether or not a recording pause period is longer than a predetermined period of time.

The present invention is characterized as a method for the intermittent recording in the time-lapse video tape recorder, which comprises the steps of: confirming whether the recording is stopped temporarily in the intermittent recording mode; and either unloading the magnetic tape or temporarily stopping the rotation of the head drum during the recording pause period.

According to the present invention, in the control method of the head drum or tape unloading of the time-lapse video tape recorder, a frame extraction ratio of a video signal, or a ratio of the number of fields to be skipped and the number of field to be recorded, is calculated from a recording time in a time-lapse recording mode that is set by a user. Based on a frame extraction ratio and the size of a memory in which the selected input video frames are temporarily stored before recording, a recording pause period or the time during which no video signal is recorded is calculated.

If the recording pause period is longer than a predetermined reference period of time, the magnetic tape is unloaded or the rotation of the head drum is stopped temporarily during the recording pause period. If the recording pause period is not longer than a predetermined reference period of time, the head drum keeps rotating and contacting with the magnetic tape during the recording pause period as in conventional time-lapse video tape recorders.

In the case where a recording pause period is long, the intermittent recording method of the present invention can prolong the life of the head drum and the magnetic tape through reduction of friction between the magnetic tape and the head drum and reduce the power consumption by the rotation of the head drum.

The above objectives, features, and advantages of the present invention will become apparent from the following detailed description of illustrative embodiments thereof to read in conjunction with the accompanying drawings.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DETAILED DESCRIPTION OF THE PREFERRED EMBODIMENTS

Figure 2:
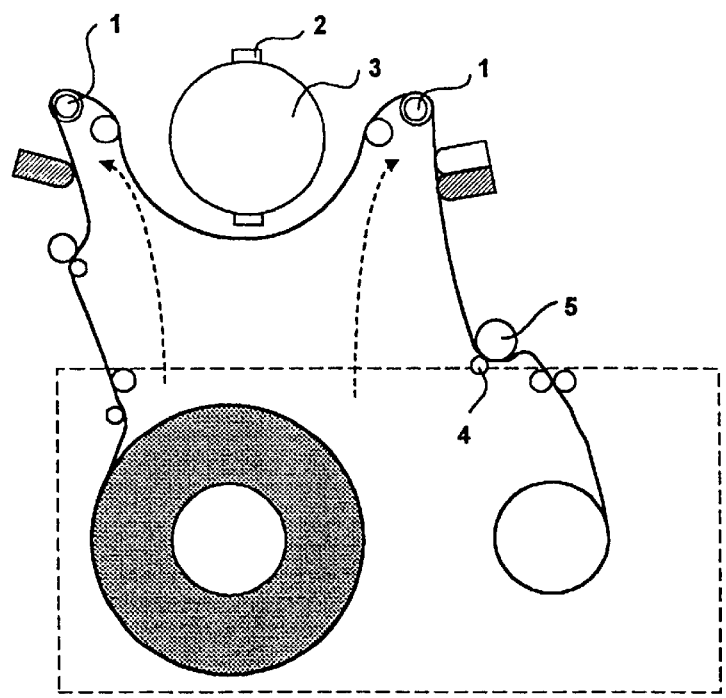
FIG. 2 shows a diagrammatic view of the recording unit when a magnetic tape is loaded for recording.
Figure 3:
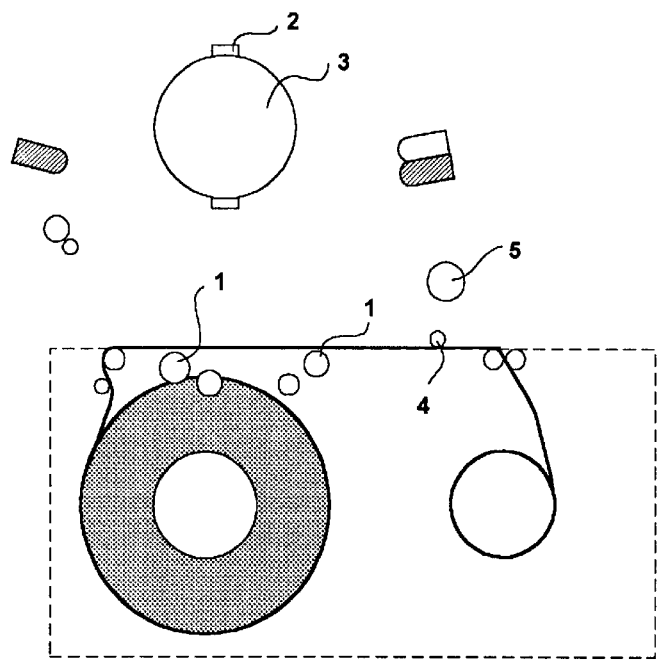
FIG. 3 shows a diagrammatic view of the recording unit when a magnetic tape is unloaded.

The intermittent recording method in a time-lapse video tape recorder according to the present invention is described below in detail with reference to schematic diagrams shown in FIG. 1, FIG. 2, and FIG. 3 and the flow chart of FIG. 5.

Figure 1:
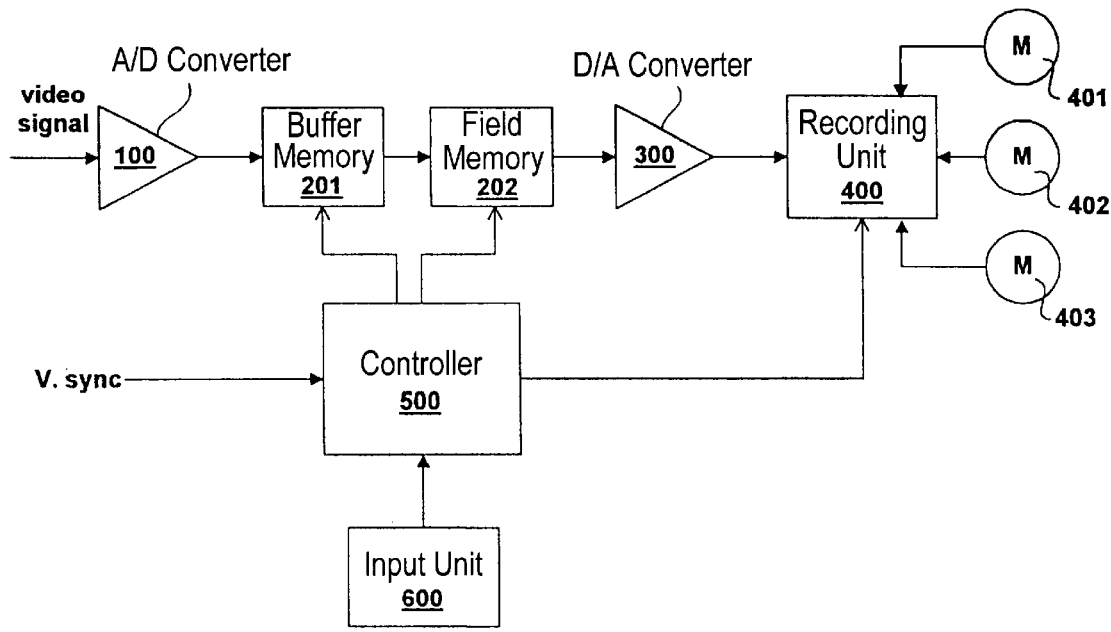
FIG. 1 shows a schematic block diagram of an embodiment of a time-lapse video tape recorder according to the present invention.

FIG.1 shows the block diagram of the time-lapse video tape recorder to which the method for controlling the intermittent recording state is applied. The time-lapse video tape recorder in FIG. 1 comprises an A/D converter 100 which converts analog video signals from a external video camera into digital data streams, a buffer memory 201 which temporarily stores the converted digital video data, a field memory 202 which transfers the video data filled in the buffer memory 201 into itself, a D/A converter 300 which converts the digital data in the field memory 202 into analog video signal, a recording unit 400 which records the converted analog video signal, and a controller 500 which controls writing/reading intervals to/from the memories 201 and 202 and the recording operation of the recording unit 400 according to commands received by an input unit 600 from a user.

Figure 5:
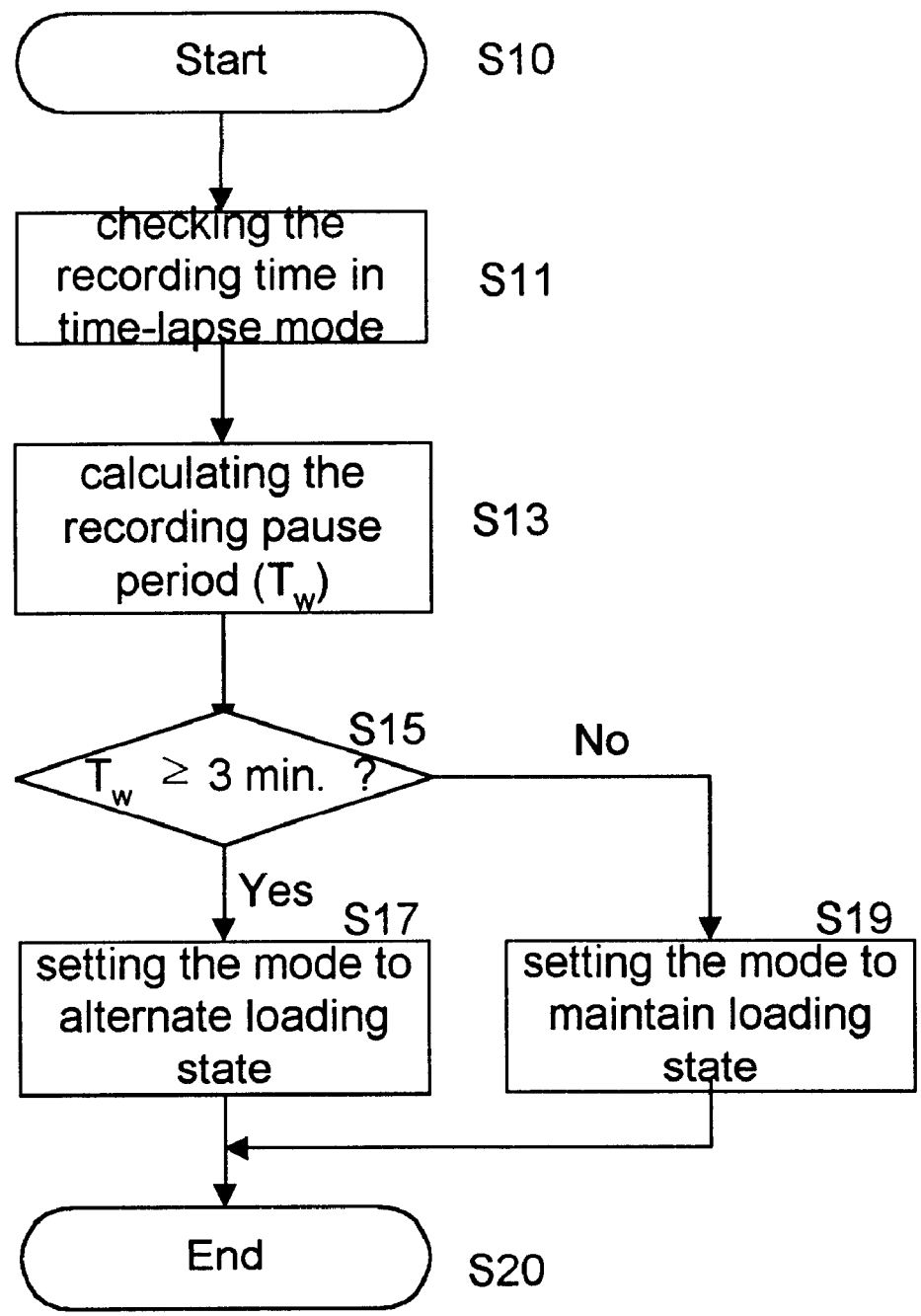
FIG. 5 is a flow chart of the magnetic tape unloading method for the intermittent recording according to the first embodiment of the present invention.

Referring to FIG. 5, when a recording time is set by a user (S11), the controller 500 calculates a recording pause period during which recording is stopped (S13). For an illustration of the calculation of the recording pause period, suppose that the running time of the magnetic tape is 2 hours and a maximum number of frames of video signal that can be stored in the field memory 202 is 150, which corresponds to 5 seconds in a normal reproduction time.

In the case of continuous recording with no time lapse, video signals from external video cameras are digitized by the A/D converter 100 and are then stored in the field memory 202 via buffer memory 201 without skipping any field.

When the number of fields of a video signal that has been successively stored in the field memory 202 equals the capacity of the field memory 202 i.e., 150 frames, the video signal in the field memory 202 is converted into an analog signal and is then recorded on the magnetic tape. While the video signal is recorded, the video signal received from the external video camera is stored temporarily in the buffer memory 201. Therefore, when the recording of video signal of 150 frames in the field memory is completed, the buffer memory 201 becomes full with the video signal of 150 frames. Then, the video signal is recorded as soon as it is transferred to the field memory 202. Thus, the video signal that is received in real time from the external video camera is recorded with some delay, but a recording pause does not occur.

On the other hand, if the time-lapse recording time of 72 hours is set by a user, or if the user intends to record the video signal received from an external video camera during 72 hours with the magnetic tape of 2 hours running time, the video signal should be recorded at a ratio of one frame to every 36 frames. In other words, one frame out of every 36 frames that have been stored in the buffer memory 201 in the digital form is transferred to the field memory 202, as shown in A of FIG. 4.

Figure 4:
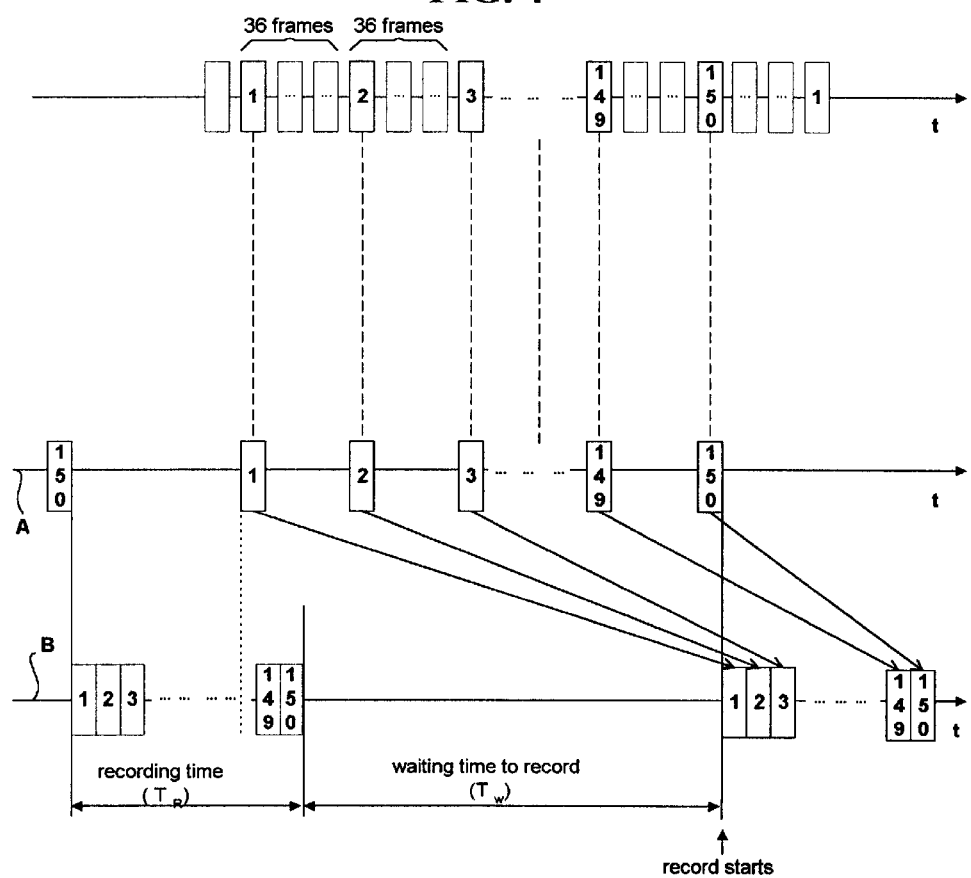
FIG. 4 is a diagram describing schematically the principle of the intermittent recording of a time-lapse video tape recorder.

When the field memory 202 is filled with the video signal of 150 frames, the video signal begins to be recorded on the magnetic tape by the controller 500, as shown in B of FIG. 4. Three minutes corresponding to the amount of 150×36 frames is required to fill the field memory 202, and it takes 5 seconds to record the 150 frames. Thus, the time during which no video signal is recorded or the recording pause period. is 2 min. and 55 seconds. The recording pause period (Tw) is given by $$Tw=Tm \times (N-1)$$

where Tm is the storage capacity of the field memory expressed in seconds and N is the compression ratio of video frames. The compression ratio in the above example is 36.

Returning to FIG. 5, after calculating the recording pause period (S13), the controller 500 checks whether or not the pause period is longer than a predetermined value e.g., 3 minutes (S15). If it is longer than 3 min., the controller 500 makes the recording unit 400 operate in an alternating recording mode where the magnetic tape is unloaded in the recording pause period as shown in FIG. 3, and then reloaded in the recording period as shown in FIG. 2 (S17). If the recording pause period is not longer than 3 min., the recording unit 400 is set to the mode where the tape is loaded all the time regardless of recording or non-recording period (S19). The recording unit 400 records the video frames intermittently in the set mode.

Figure 6:
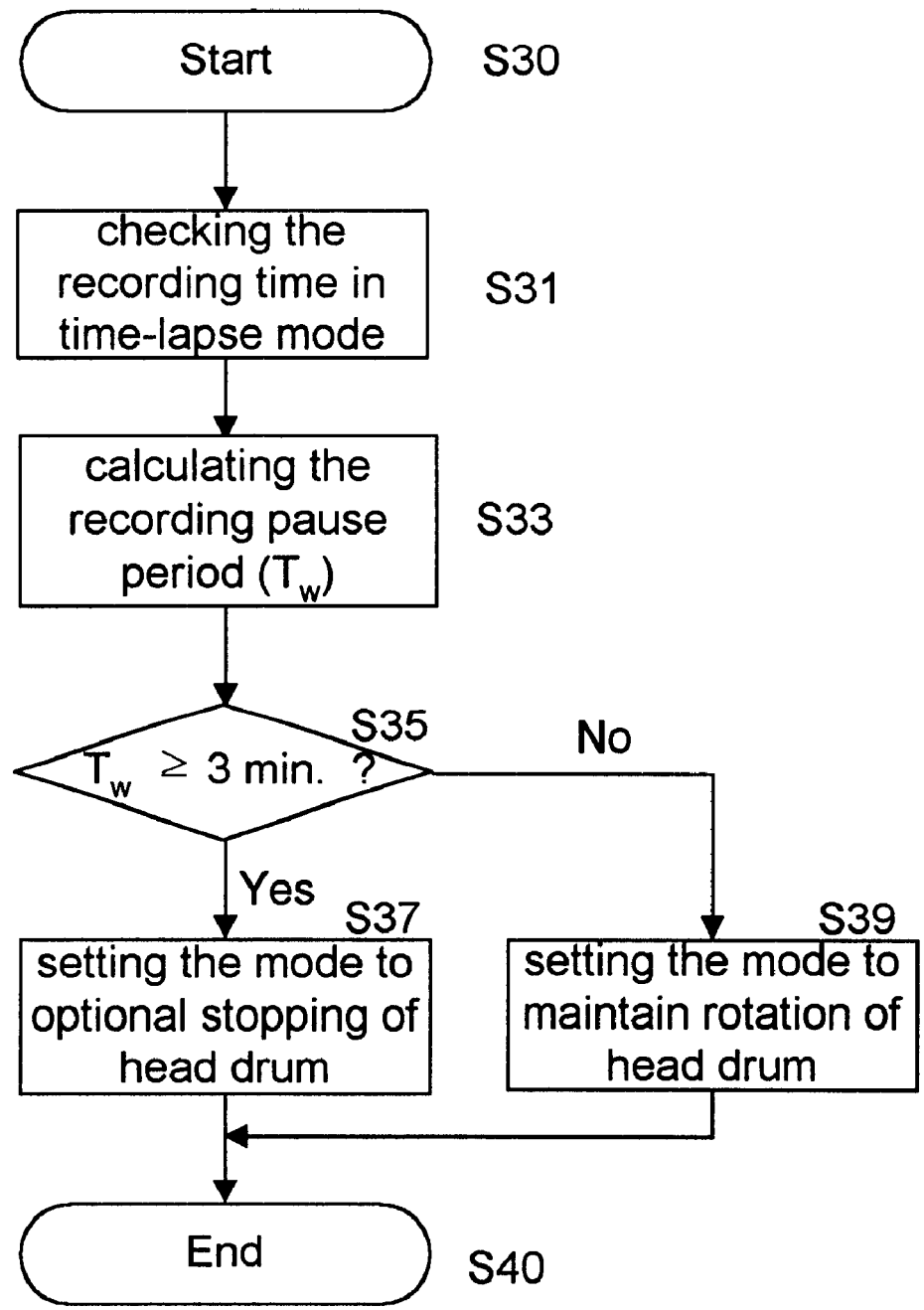
FIG. 6 is a flow chart of the head drum stopping method for the intermittent recording according to the second embodiment of the present invention.

FIG. 6 shows a flow chart of the head drum stopping method for the intermittent recording according to another embodiment of the present invention. With the same procedures as shown in FIG. 5, the recording pause period is calculated based on the time-lapse recording time set by a user and is then compared against the predetermined reference period e.g., 3 minutes (S31~S35). If the calculated recording pause period is longer than the 3 minutes, an alternating recording mode is set and the rotation of the head drum is stopped during the recording pause period and the head drum rotates only when the video signal is recorded (S37). Otherwise, the recording mode is maintained where the head drum keeps rotating all the time (S39).

Figures 7, 8:
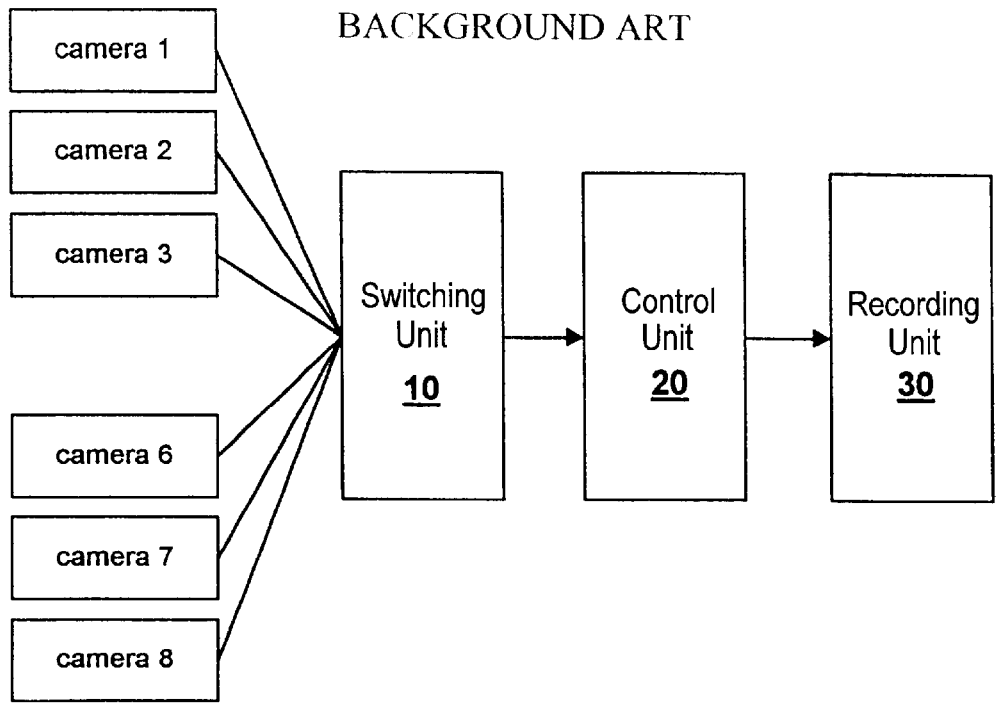
FIG. 7 is a table showing illustrative values of the recording pause period according to recording time in the time-lapse recording mode and a decision boundary of tape unloading or drum rotation stopping based on the calculated recording pause period.
FIG. 8 shows a general block diagram of a conventional time-lapse video tape recorder.

Given that the capacity of the field memory is 5 seconds, FIG. 7 shows different values of the recording pause period according to the various recording times in the time-lapse recording mode and a decision boundary of the tape unloading or the drum rotation stopping based on the calculated recording pause period.

Even though 4 seconds or so is a sufficient time to rotate the head drum that was stopped during the recording pause period at the normal rotation speed, the length of 3 minutes in FIG. 5 is used for a reference period of time by which a decision is made as to whether the magnetic tape is unloaded. This is because if a reference period shorter than 3 min. is used, frequent alternation between tape loading and unloading state may cause unstable driving of the recording deck or damage the recording unit. Likewise, whether or not the rotation of the head drum should be stopped is determined by using a reference period of 3 min. because it is desirable to allow a sufficient amount of time so as to stabilize the rotation speed of the head drum.

Unlike the above embodiments, a reference period of time other than 3 min. can be used for the two methods for the intermittent recording. For example, a reference period of time shorter than 3 min. can be used in the head drum stopping method for the intermittent recording.

The foregoing is provided only for the purpose of illustration and explanation of the preferred embodiment of the present invention, so changes, variations and modifications may be made without departing from the spirit and scope of the invention.

What is claimed is:

1. A method for controlling the intermittent recording state in a time-lapse video tape recorder, comprising the steps of:
   calculating a recording pause period in accordance with a frame compression ratio of video signal and the capacity of temporary storage to store compressed video frames prior to recording, which is the time period after recording stops until the next recording begins; and
   unloading a tape only when the calculated recording pause period is longer than a predetermined period of time.

2. A method for controlling the intermittent recording state in a time-lapse video recorder, comprising the steps of:
   calculating a recording pause period in accordance with a frame compression ratio of video signal and the capacity of temporary storage to store compressed video frames prior to recording, which is the time period after recording stops until the next recording begins; and
   stopping the rotation of a head drum only when the calculated recording pause period is longer than a predetermined period of time.

3. The method according to claim 1, wherein said frame compression ratio of video signal is based on the time-lapse recording time.

4. The method according to claim 2, wherein said frame compression ratio of video signal is based on the time-lapse recording time.

5. A method of controlling engagement of a tape medium with a recording/reproducing head, comprising the following steps:
   receiving an operating mode from a user, the operating mode having an operation period and a pause period, operations being performed on the tape medium during the operation period, and no operation being performed on the tape medium during the pause period;
   receiving video data;
   extracting frames of the video data at a rate according to the operating mode;
   storing the extracted frames of the video data in a memory;
   determining the pause period based on the rate and a capacity of the memory;
   comparing the pause period to a predetermined period of time; and
   disengaging the tape medium from the head during the pause period based on results of the comparing step.

6. The method of claim 5, wherein the disengaging step disengages the tape medium from the head when the comparing step indicates the pause period exceeds the predetermined period of time.

7. The method of claim 5, further comprising the step of recording the stored frames of the video data on the tape medium during the operation period.

8. A method of controlling rotation of a recording/reproducing head of a recording/reproducing apparatus, comprising the following steps:
   receiving an operating mode from a user, the operating mode having an operation period and a pause period, operations being performed on a tape medium by the head during the operation period, and no operation being performed on the tape medium during the pause period;
   receiving video data;
   extracting frames of the video data at a rate according to the operating mode;
   storing the extracted frames of the video data in a memory;
   determining the pause period based on the rate and a capacity of the memory;
   comparing the pause period to a predetermined period of time; and
   stopping rotation of the head during the pause period based on results of the comparing step.

9. The method of claim 8, wherein the stopping step stops rotation of the head when the comparing step indicates the pause period exceeds the predetermined period of time.

10. The method of claim 8, further comprising the step of recording the stored frames of the video data on the tape medium during the operation period.

11. An apparatus for controlling engagement of a tape medium with a recording/reproducing head, comprising:
    an input unit receiving an operating mode from a user, the operating mode having an operation period and a pause period, operations being performed on the tape medium during the operation period, and no operation being performed on the tape medium during the pause period;
    an operating unit including a recording/reproducing head, the operating unit performing the operations on the tape medium;
    a memory receiving frames of video data, and extracting and storing the frames of video data at a rate according to the operating mode; and
    a controller determining the pause period based on the rate and a capacity of the memory, comparing the pause period to a predetermined period of time, and causing the operating unit to disengage the tape medium from the head during the pause period based on results of the comparison.

12. The apparatus of claim 11, wherein the controller causes the operating unit to disengage the tape medium from the head when the pause period exceeds the predetermined period of time.

13. The apparatus of claim 11, wherein the operating unit records the stored frames of video data on the tape medium during the operation period.

14. An apparatus for controlling rotation of a recording/reproducing head of a recording/reproducing apparatus, comprising:
    an input unit receiving an operating mode from a user, the operating mode having an operation period and a pause period, operations being performed on a tape medium by the head during the operation period, and no operation being performed on the tape medium during the pause period;

an operating unit including the head, the operating unit performing the operations on the tape medium;

a memory receiving frames of video data, and extracting and storing the frames of video data at a rate according to the operating mode; and a controller determining the pause period based on the rate and a capacity of the memory, comparing the pause period to a predetermined period of time, and causing the operating unit to stop rotation of the head during the pause period based on results of the comparison.

15. The apparatus of claim 14, wherein the controller stops rotation of the head when the pause period exceeds the predetermined period of time.

16. The apparatus of claim 14, wherein the operating unit records the stored frames of video data on the tape medium during the operation period.

* * * * *